United States Patent
Bruehl et al.

(10) Patent No.: US 7,068,426 B2
(45) Date of Patent: Jun. 27, 2006

(54) METHOD OF CALIBRATING A STEREOMICROSCOPE AND A STEREOMICROSCOPE CAPABLE OF BEING CALIBRATED

(75) Inventors: Wolfgang Bruehl, Rodgau (DE); Danilo Parlatano, Widnau (CH); Peter Bertschi, Altstätten (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 31 days.

(21) Appl. No.: 10/455,112

(22) Filed: Jun. 5, 2003

(65) Prior Publication Data
US 2004/0004762 A1 Jan. 8, 2004

(30) Foreign Application Priority Data
Jun. 6, 2002 (DE) ............................... 102 25 193

(51) Int. Cl.
*G02B 21/22* (2006.01)
(52) U.S. Cl. .................... 359/378; 359/900; 359/380
(58) Field of Classification Search ................ 359/363, 359/368, 380
See application file for complete search history.

(56) References Cited

U.S. PATENT DOCUMENTS 4,027,942 A    6/1977  Fukushige (Continued)

FOREIGN PATENT DOCUMENTS

DE    197 45 270 C1    2/1999

(Continued)

OTHER PUBLICATIONS

Kline, D. Cell Biology: Microscopy. Kent State University [online]. 1997, 1999 [retrieved on Oct. 1, 2004]. Retrieved from the Internet:<URL:http://dept.kent.edu/projects/cell/intro2.htm>.*

(Continued)

*Primary Examiner*—Mark A. Robinson
*Assistant Examiner*—Mark Consilvio
(74) *Attorney, Agent, or Firm*—Hodgson Russ LLP

(57) ABSTRACT

A method of calibrating the magnification of a stereomicroscope having variable magnification comprises the steps of (A) positioning an object reference measure (10) with a known scaling in an object plane (8) of the stereomicroscope; (B) providing an eyepiece reference measure (6a) of known scaling in an intermediate image plane (7) of the stereomicroscope; (C) varying the magnification of the stereomicroscope using a zoom system (4) thereof so that an image of the object reference measure (10) is brought into optical alignment (coincidence) with the eyepiece reference measure (6a) in the intermediate image plane (7) in order to determine a zoom position of the zoom system (4) corresponding to this alignment; (D) determining an actual magnification of the stereomicroscope in the zoom position on the basis of a lateral magnification defined by the scalings of the object reference measure (10) and eyepiece reference measure (6a) which have been brought into alignment; (E) determining a nominal magnification of the stereomicroscope in the zoom position; (F) correlating the actual magnification and nominal magnification by computer; and (G) calculating magnifications for other zoom positions using the computer correlation of nominal magnification and actual magnification.

21 Claims, 3 Drawing Sheets

U.S. PATENT DOCUMENTS

| | | |
|---|---|---|
| 4,068,381 A | 1/1978 | Ballard et al. |
| 4,787,734 A | 11/1988 | Matsumura |
| 5,137,363 A | 8/1992 | Kosugi et al. |
| 5,276,550 A | 1/1994 | Kojima |
| 5,389,774 A | 2/1995 | Gelman et al. |
| 5,907,431 A | 5/1999 | Stuttler |
| 2002/0176160 A1 | 11/2002 | Suzuki et al. |

FOREIGN PATENT DOCUMENTS

| | | |
|---|---|---|
| EP | 0 822 436 A2 | 2/1998 |
| JP | 06291013 | 10/1994 |
| JP | 11135053 | 5/1999 |
| JP | 2000-75216 | 3/2000 |
| JP | 2000323081 A | 11/2000 |

OTHER PUBLICATIONS

Fellers, Thomas J., et al., Nikon Microscopy U: Basic Concepts and Fomulas in Microscopy, Oct. 28, 2002, [online], [retrieved on Aug. 25, 2005] Retrieved from the Internet <URL:http:/www.microscopyu.com/articles/formulas/measurements.html>.*

* cited by examiner

US 7,068,426 B2

METHOD OF CALIBRATING A STEREOMICROSCOPE AND A STEREOMICROSCOPE CAPABLE OF BEING CALIBRATED

CROSS REFERENCE TO RELATED APPLICATION

This application claims priority of German patent application 102 25 193.2 filed Jun. 6, 2002, which is incorporated by reference herein.

FIELD OF THE INVENTION

The present invention relates to a method of calibrating a stereomicroscope having variable magnification, and a stereomicroscope which is correspondingly capable of being calibrated. The invention further relates to method of measuring an unknown distance in an object plane of a stereomicroscope using a calibrated stereomicroscope.

DESCRIPTION OF THE RELATED ART

Stereomicroscopes with zoom systems which allow the magnification to be varied continuously while the position of the object and image remain stationary are known. These systems generally have at least two sets of lenses which are movable relative to one another in order to implement the change of magnification while the position of the object and image remain stationary. The correlation between the position of the zoom sets and the magnifications of the zoom system may also be presumed to be known in the form of functions or look-up tables.

An indication of the magnification of a stereomicroscope is also known, e.g. using a scale provided on a rotary knob which is turned for the purpose of the relative movement of the zoom sets.

The total magnification of a stereomicroscope is by definition formed by multiplying the lateral magnification of the image of an object in the intermediate image plane which is in the focal plane of an eyepiece, by the magnification of the eyepiece. The lateral magnification is in turn—particularly in stereomicroscopes of modular construction—typically the product of the magnification of an auxiliary lens, the magnification of an objective, the tube factor of an intermediate optic, a tube lens and the magnification factor of a zoom system in its zoom position. The magnification calculated on the basis of the lateral magnification and the magnification specifications of these components is, in the following, referred to as nominal or rated magnification. As all of the above mentioned components have manufacturing tolerances and inaccuracies of measurement, simply stating a nominal lateral magnification or a nominal overall magnification for measuring tasks on an object is generally too imprecise.

Precise determination of an existing imaging scale by comparing the size of the object and image is also known. In stereomicroscopes with variable magnification it is also possible to calibrate particular magnification values, usually values of a maximum or minimum magnification. However, calibrations of this kind only apply to the actual magnification values at which the calibration was carried out. Accordingly, with microscopes of this kind it is not usual to adapt the magnification indicator as a result of a carried out calibration.

A known method of evaluating microscopic images is to superimpose standardised reticle plates over these images as a reference or reference measurement. Comparison distances or tolerance ranges may be provided on the reticle plate. In this case the object can only be evaluated accurately on exactly the imaging scale for which the reticle plates are produced. For stereomicroscopes with variable magnification it is therefore important that the lateral magnification should be capable of being adjusted precisely.

SUMMARY OF THE INVENTION

The aim of the present invention is to allow easy calibration of the magnification of a stereomicroscope with variable magnification for any desired magnifications, while calibration over the entire range of magnifications should be able to be derived on the basis of such calibration. A further aim is to provide a digital indication of a specific magnification selected, over the entire range of magnifications of a microscope of this kind.

According to the invention it is now possible to calibrate a stereomicroscope equipped with a zoom system at any desired magnification positions or zoom positions. By a suitable choice of the object and eyepiece reference measures or scales used according to the invention any desired magnifications can first be defined (within the scope of the zoom range of a microscope which is to be calibrated). According to the invention, after calibration on the basis an object and eyepiece reference measurepair, calibration over the entire zoom range can be made available or derived by computation. According to the invention, actual magnifications determined by the actuation of the zoom are set up on the microscope by means of an object and eyepiece reference measurepair. The positions (of the individual lenses) of the zoom are detected, for example, by means of incremental indicators, a nominal magnification value being stored for each zoom position. By computer comparison of the actual magnification with the nominal magnification it is possible to calculate a correction factor which can then be used to calibrate the overall zoom range.

Advantageous embodiments of the invention are recited in the subsidiary claims.

According to a preferred embodiment of the process according to the invention the actual magnification and nominal magnification of the stereomicroscope for at least two different zoom positions are determined and correlated, while magnifications for additional zoom positions are calculated on the basis of the correlation of the actual magnifications and nominal magnifications associated with one another. In particular, it has proved advantageous to carry out a computerized correlation of the actual magnification and nominal magnification at two zoom positions. By this means it is possible, for example, to carry out a plurality of calibrations over the zoom range of a stereomicroscope and then to calculate the particular intermediate magnification values. By this means the accuracy of calibration can be further increased.

The eyepiece reference measure (eyepiece reference scale) in a field of vision expediently has at least one circle of known diameter as scaling. Such circles can easily be made to coincide optically with an image of a conventional object micrometer.

According to a preferred embodiment of the process according to the invention, the calculated magnifications corresponding to the other focal length values are digitally displayed on the stereomicroscope. Owing to the fact that the magnifications of the stereomicroscope are calculated and stored for any desired number of positions of the zoom system, digital display of the corresponding magnifications is possible. In order to achieve a digital display of this kind all that is needed is to determine an actual zoom position, for example by means of an incremental indicator, and to relate it to a correspondingly correlated magnification value.

The focal length of the zoom objective is conveniently altered manually or by a motor. The object and eyepiece reference measures (scales) can easily be brought into alignment manually according to the invention. If corresponding optical recognition systems are provided the optical alignment can also be detected automatically.

According to a particularly preferred embodiment of the process according to the invention the optical alignment (or coincidence) of the object reference measure and eyepiece reference measure is manually or automatically communicated to a processor device of the stereomicroscope by means of which the magnifications for the other positions are then calculated. In particular, it is advantageous to actuate the zoom system manually in order to obtain optical alignment, and, once such alignment has been established, to communicate this to the processor device manually by operating a corresponding operating key of the processor device.

By means of the calibration according to the invention it is possible particularly advantageously to measure a distance in the object plane of the stereomicroscope. For this, an image of a distance to be measured in the object plane is brought into optical alignment with a known distance in the eyepiece reference measurement by changing the zoom position of the zoom system, and the length of the distance to be measured is calculated from the lateral magnification determined for this zoom position and the known distance in the eyepiece reference measurement.

It has proved advantageous to have a digital display of the length of a distance measured in this way.

It is possible, in particular, to use the circles used for the calibration on the eyepiece reference measurement for measurement of length. It is also possible to provide an eyepiece reference measurement having a plurality of circles in which some of the circles are provided for calibration and others are provided for the measurement of length.

BRIEF DESCRIPTION OF THE DRAWINGS

The invention will now be described more fully with reference to the accompanying drawings, wherein.

DETAILED DESCRIPTION OF THE INVENTION

Figure 1:
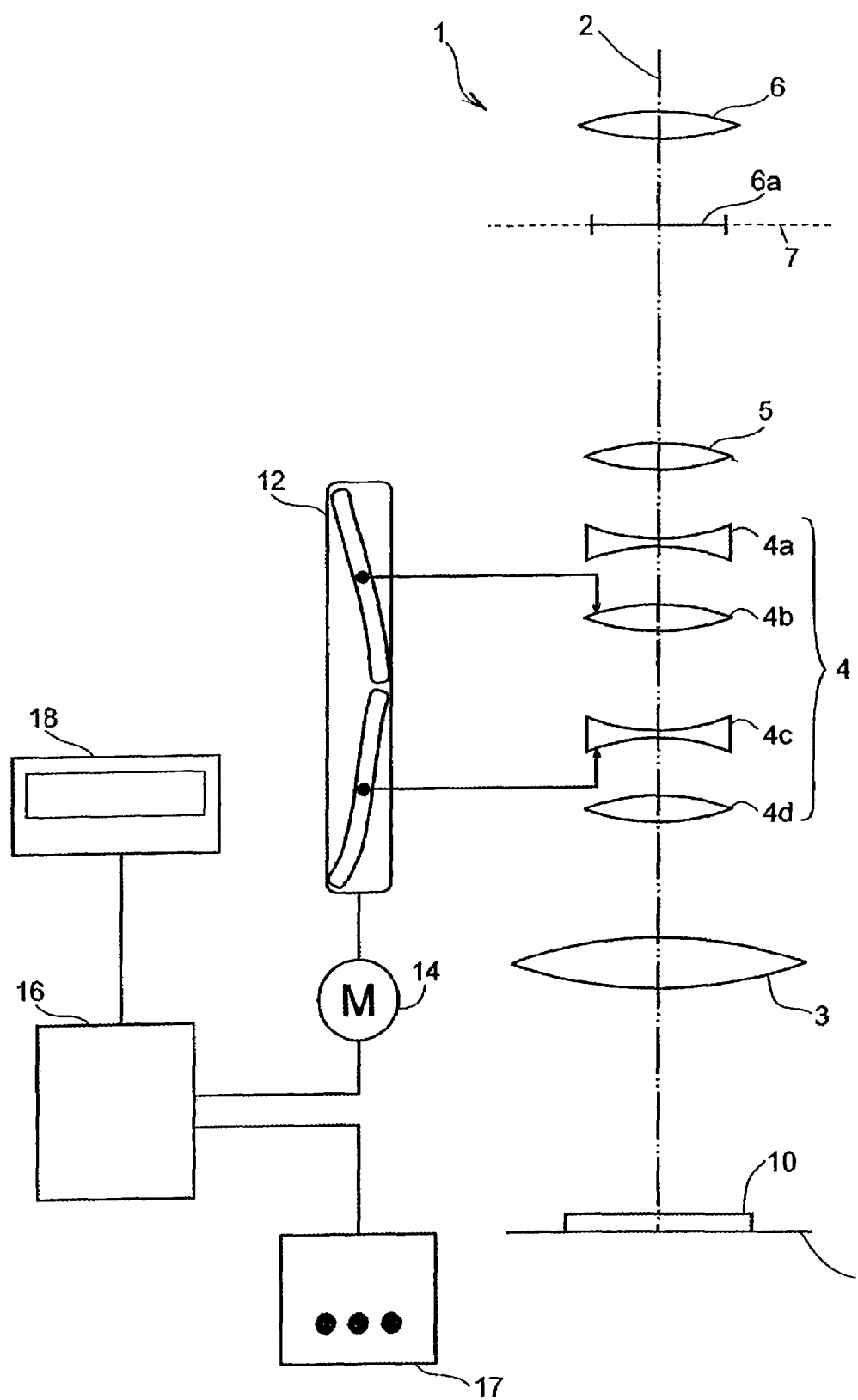
FIG. 1 is a diagrammatic side view of the essential components of a stereomicroscope equipped with a zoom system, in which the present invention is implemented.

A preferred embodiment of a stereomicroscope in which the present invention is implemented is shown in FIG. 1. The stereomicroscope, generally designated 1, has a fixed-position objective 3 along an optical axis 2, a zoom telescope generally designated 4, a tube lens 5 and an eyepiece 6. An object plane of the microscope is designated 8. An object micrometer 10 is positioned on this object plane as an object reference measurement. Positioning means, e.g. means for fixing the object micrometer 10 on the object plane 8, are not specifically shown, but could be a spring clip, a magnetic means, a clamp, a fitting, or any other fixing means. In stereomicroscopes, zoom telescopes, tube lenses and eyepieces for an imaging channel extending to the right or left eye are duplicated (not shown here).

The fixed-position objective 3 is constructed as a mono-objective so that it is used jointly by the two parallel zoom systems and accordingly two parallel-mounted tube lenses and eyepieces. Greenough stereomicroscopes are also known wherein two separate zoom objectives image the object into the two intermediate images formed there. The present invention may also be used in stereomicroscopes of this kind.

At least two of the lens members 4a, 4b, 4c and 4d of the zoom telescope 4 are movable, in known manner, by the actuation-of a spindle or control cam 12 to produce a mechanical equalisation such that the image location remains unchanged while the magnification of the zoom telescope is variable. In particular, a zoom telescope 4 of this kind can be produced so that the outer lenses 4a, 4d are fixed with respect to the optical axis 2 and the middle lenses 4b, 4c are movable.

The eyepiece 6 is constructed with an eyepiece reticle plate 6a as the eyepiece reference measurement. The eyepiece reticle plate is to be positioned in the intermediate image plane 7 of the stereomicroscope, thus providing a measuring eyepiece in known manner.

The control cam 12 can be actuated automatically by means of a motor 14, while the motor 14 is controlled by a processor 16. The lenses of the zoom objective 4 can also be adjusted manually by means of a handwheel not shown in FIG. 1. Reference numeral 17 denotes a unit constructed as an operating panel by means of which commands, e.g. to start or finish a calibration process, can be input into the system.

The stereomicroscope according to the invention is also constructed with a display 18 indicating the current magnification of the stereomicroscope. The display 18 is acted upon by the processor 16 with corresponding data as will be explained hereinafter.

Figure 2:
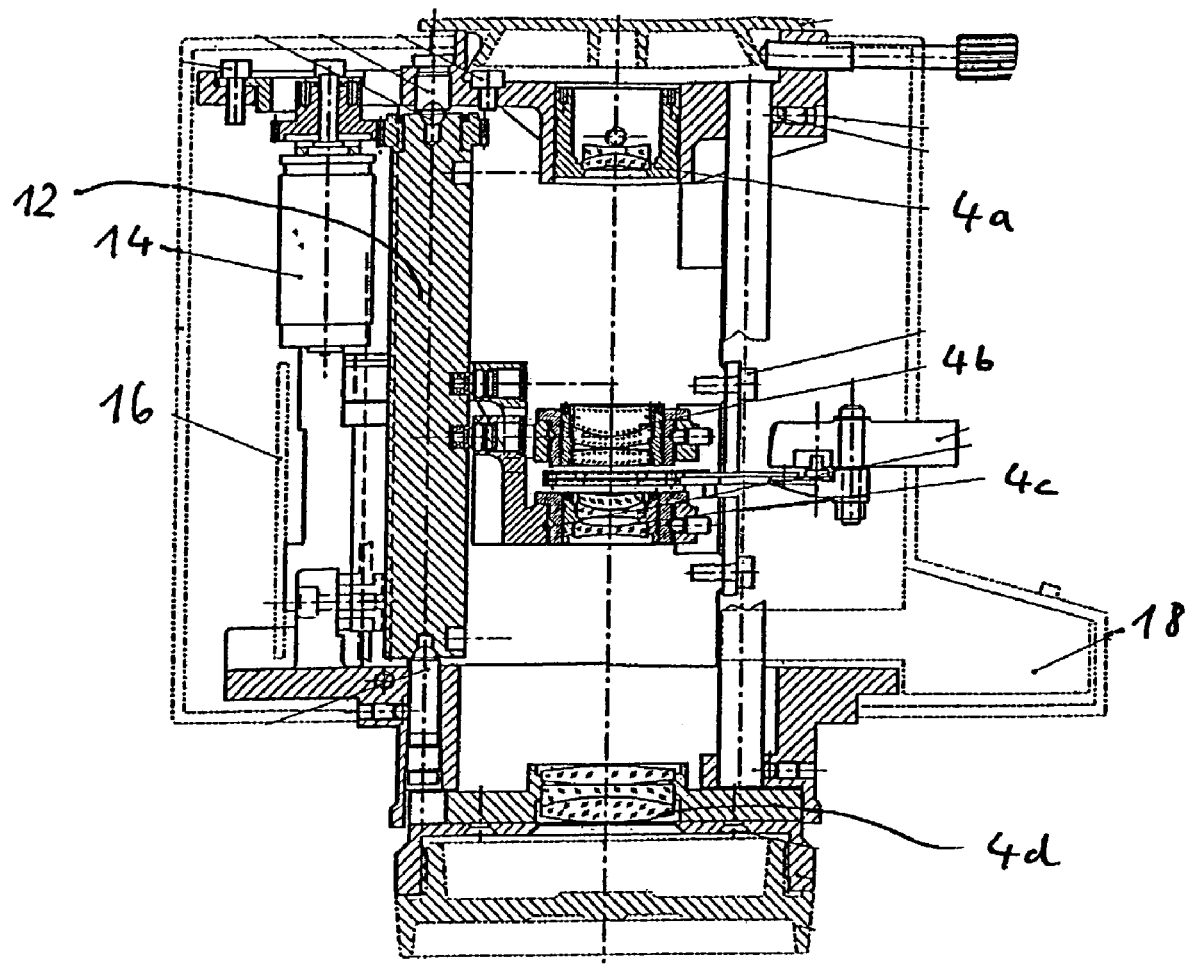
FIG. 2 shows a preferred embodiment of a zoom system which may be used according to the invention, in sectional side elevation.

A preferred embodiment of a zoom objective which may be used according to the invention in shown in greater detail in FIG. 2, in which components already discussed with reference to FIG. 1 have been given the same reference numerals.

Referring again to FIG. 1 it should be assumed that the object micrometer 10 and the eyepiece reticle plate 6a have a known scale or scale graduations.

Figure 3:
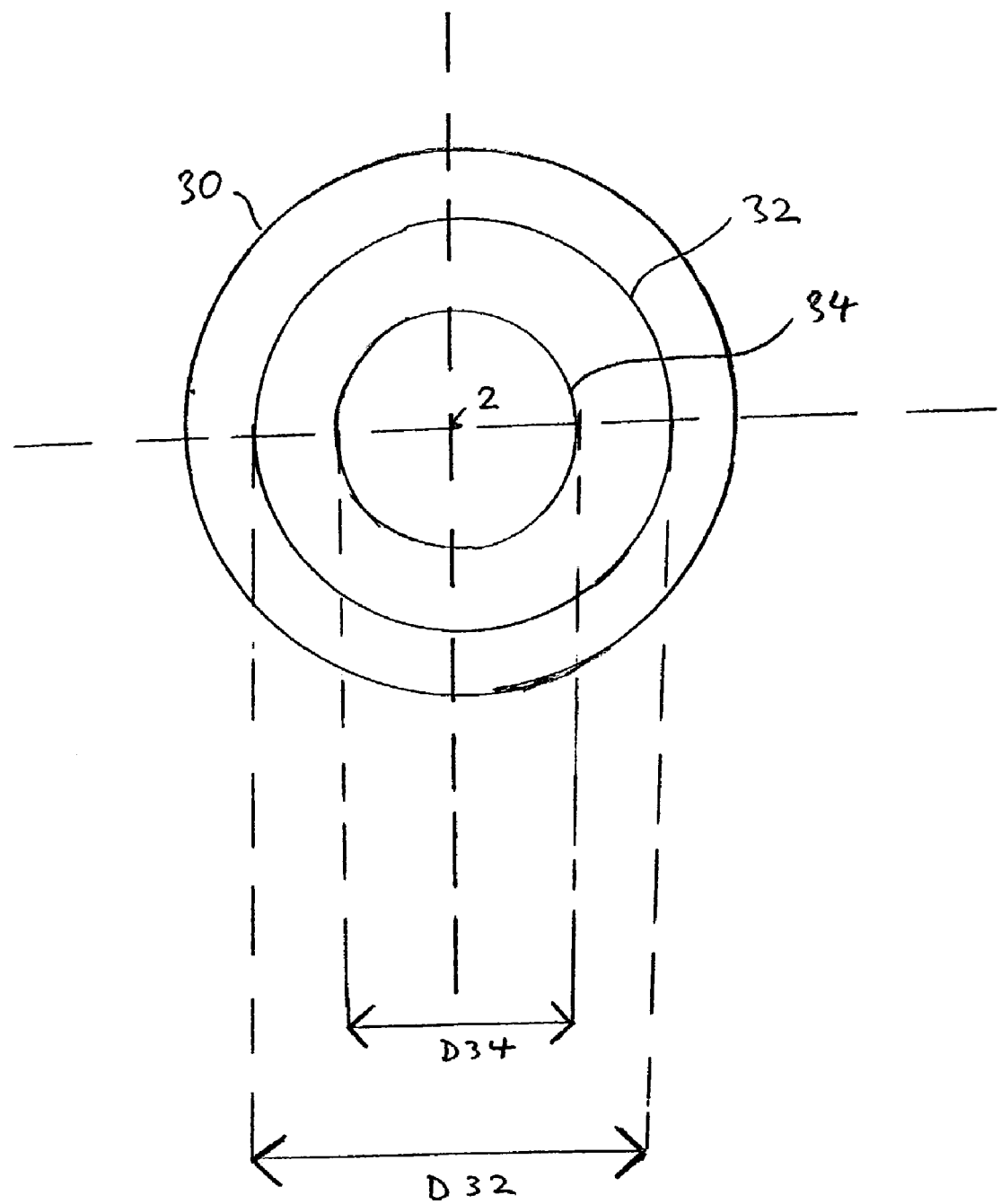
FIG. 3 shows a plan view of a preferred embodiment of an eyepiece reference measurement used according to the invention.

A preferred embodiment of an eyepiece reticle plate 6a of this kind is shown in FIG. 3. Within a field of vision 30 are shown two concentric circles 32, 34 with diameters D32 and D34, respectively. The diameters D32 and D34 are known from the outset. It is also possible to construct an eyepiece reticle plate 6a of this kind with only one circle or with any desired number of circles. These circles may be used for calibration and/or for measuring distance, as will be explained in detail hereinafter.

As the scaling of the object micrometer 10 is also already known, as mentioned above, a reference distance on the object micrometer 10 can be brought into optical alignment (coincidence), with one of the diameters D32 or D34 by varying the magnification of the zoom system 4, i.e. in the field of vision 30 or intermediate image plane 7 the reference measurement corresponds to (coincides with) one of the diameters D32 or D34. Let us assume, for example, that in the present case optical alignment (coincidence) with the larger diameter D32 is obtained.

As the dimensions of the reference measurement on the object micrometer 10 and the diameter D32 of the eyepiece reticle plate are already known a specific magnification (actual magnification) obtained when these measurements are brought into optical alignment can be derived directly. In this case, the reference distance is in inverse proportion to the magnification. Once this optical alignment has been obtained the proportionality factor can easily be calculated. All in all, this means that the length of the reference measurement in the object plane is equal to the diameter of the circle 32 brought into optical alignment therewith, divided by the lateral magnification explained hereinbefore. The total magnification of the stereomicroscope is finally obtained by multiplying this lateral magnification by the magnification of the eyepiece 6.

The zoom position obtained with this optical alignment (coincidence), or the position of the individual lens members, is determined by means of an incremental indicator (not shown). For the zoom position thus obtained, a nominal magnification of the zoom system 4 stored in a suitable memory (not shown) is read off and passed to the processor 16. By means of the actual magnification determined and the nominal magnification stored in the memory the processor is capable of calculating a correction factor which can be applied over the entire zoom range of the zoom objective 4 or the entire magnification range of the stereomicroscope to calculate the actual magnifications. Thus, on the basis of the calibration shown, in only one position of the zoom system 4, it is possible to achieve calibration over the entire zoom range or range of magnifications of the stereomicroscope.

Conveniently, an actual magnification is determined as described above with the same object micrometer reference distance for the second circle 34 of the eyepiece reticle plate 6a as well, so that a second actual magnification can be determined. Analogously, here again a comparison is made with a nominal magnification stored in the memory and the two correction factors thus obtained are expediently correlated with one another and a mean value is obtained, for example. In this context it is also possible to correct a first partial zoom range with a first correction factor and a second partial zoom range with a second correction factor.

According to a preferred embodiment the process described is carried out by achieving optical alignment (coincidence) between a reference distance of the object micrometer 10 and a circle 32, 34 of the eyepiece reticle plate 6a and then actuating an operating key on the operating panel 17 to communicate this optical alignment to the processor 16. It is also conveniently possible to communicate to the processor 16, by the press of a key, which of the circles 32, 34 is currently being viewed for the purposes of calibration.

As already mentioned, the processor 16 is capable of calculating magnifications over the entire range of adjustments of the zoom system or of the microscope, with an actual magnification determined for a particular zoom position and a nominal magnification associated with this position. The magnifications which can thus be calculated for any desired zoom positions within the zoom range may then be passed over to the display means 18 in order to be displayed. It should also be pointed out once again that the total magnification of the stereomicroscope is obtained by multiplying the lateral magnification obtained by the eyepiece magnification.

As already mentioned, it is easy to measure distance or object sizes in the object plane 8 using a stereomicroscope calibrated as described above. To do this, the image of the distance to be measured is brought into optical alignment with one of the circles 32, 34 of the eyepiece reference measurement 6a in the intermediate image plane 7 by varying the zoom position. On the basis of the known diameter of a circle 32, 34 of this kind and a lateral magnification which is known (in each position of the zoom system) or calibrated according to the invention, it is then easy to measure the given distance in the object plane 8.

What is claimed is:

1. A method of calibrating the magnification of a stereomicroscope, the stereomicroscope comprising an optical zoom system (4) for continuously varying the magnification of the stereomicroscope, the zoom system including at least one fixed optical lens member (4a, 4d) and at least one movable optical lens member (4b, 4c) aligned along an optical axis (2) of the zoom system, wherein the at least one movable optical lens member is axially positionable relative to the at least one fixed optical lens member along the optical axis of the zoom system through a continuous range of positions to vary the magnification, the zoom system having a zoom position defined by an axial position of the at least one movable optical lens member, the method comprising the steps of:

positioning an object reference measure (10) in an object plane (8) of the stereomicroscope, the object reference measure having scale markings of known spacing;

providing an eyepiece reference measure (6a) in an intermediate image plane (7) of the stereomicroscope, the eyepiece reference measure having scale markings of known spacing;

varying the magnification of the stereomicroscope using the zoom system (4) so that an image of the object reference measure (10) is brought into optical coincidence with the eyepiece reference measure (6a) in the intermediate image plane (7), such that at least two scale markings of the object reference measure are optically aligned in the intermediate image plane with at least two scale markings of the eyepiece reference measure;

determining an actual magnification of the stereomicroscope in the zoom position corresponding to the optical coincidence on the basis of a lateral magnification defined by the aligned scale markings of the of the object reference measure (10) and the eyepiece reference measure (6a);

determining a nominal magnification of the stereomicroscope in the zoom position corresponding to the optical coincidence;

correlating the actual magnification and the nominal magnification by computer to calculate a correction factor at the zoom position; and calculating magnifications for other zoom positions of the zoom system using the correction factor and corresponding nominal magnifications respectively associated with the other zoom positions.

2. The method according to claim 1, wherein the correction factor is an average correction factor calculated for at least two different zoom positions.

3. The method according to claim 1, wherein the eyepiece reference measure (6a) in a field of vision (30) of an intermediate image plane (7) of the stereomicroscope is provided in the form of at least one circle (32, 34) of known diameter.

4. The method according to claim 1, further comprising the step of displaying the calculated magnifications digitally on the stereomicroscope.

5. The method according to claim 1, wherein the zoom position of the zoom system (4) is adjusted manually to vary the magnification of the stereomicroscope.

6. The method according to claim 1, wherein the zoom position of the zoom system (4) is adjusted by a motor to vary the magnification of the stereomicroscope.

7. The method according to claim 6, wherein the zoom position of the zoom system (4) is adjusted automatically.

8. The method according to claim 1, wherein the optical coincidence of the object reference measure (10) and eyepiece reference measure (6a) is communicated to a processor device (16) of the stereomicroscope, the processor device (16) carrying out the calculation of the magnifications for the other zoom positions using the correction factor.

9. The method according to claim 1, wherein the object reference measure (10) is an object micrometer.

10. The method according to claim 1, wherein the eyepiece reference measure (6a) is a reticle plate.

11. The method according to claim 1, wherein magnifications for other zoom positions are calculated over an entire zoom range of zoom system (4) using the correction factor.

12. A stereomicroscope comprising:
 means for positioning an object reference measure (10) in an object plane (8), the object reference measure having scale markings of known spacing;
 an eyepiece reference measure (6a) in an intermediate image plane (7), the eyepiece reference measure having scale markings of known spacing;
 a zoom system for continuously varying the magnification of the stereomicroscope, the zoom system including at least one fixed optical lens member (4a, 4d) and at least one movable optical lens member (4b, 4c) aligned along an optical axis (2) of the zoom system, wherein the at least one movable optical lens member is axially positionable relative to the at least one fixed optical lens member along the optical axis of the zoom system through a continuous range of positions to vary the magnification, the zoom system having a zoom position defined by an axial position of the at least one movable optical lens member, the zoom system being operable to bring an image of the object reference measure (10) into optical coincidence with the eyepiece reference measure (6a) such that at least two scale markings of the object reference measure are optically aligned in the intermediate image plane with at least two scale markings of the eyepiece reference measure to obtain an actual magnification of the stereomicroscope in a zoom position corresponding to the optical coincidence, which corresponds to the lateral magnification defined by the aligned scale markings of the object reference measure (10) and the eyepiece reference measure (6a);
 means for determining a nominal magnification of the stereomicroscope in the zoom position corresponding to the optical coincidence and for correlating the actual magnification and nominal magnification determined for this zoom position to calculate a correction factor; and
 means for calculating magnifications for other zoom positions using the correction factor and corresponding nominal magnifications respectively associated with the other zoom positions.

13. The stereomicroscope according to claim 12, wherein the scale markings of the eyepiece reference measure (6a) include at least one circle (32, 34) of known diameter.

14. The stereomicroscope according to claim 12, further comprising means (18) for digitally displaying the calculated magnifications.

15. The stereomicroscope according to claim 12, wherein the means for varying the magnification of the strereomicroscope includes means for manually adjusting the zoom position of the zoom system.

16. The stereomicroscope according to claim 12, wherein the means for varying the magnification of the strereomicroscope includes a motor for adjusting the zoom position of the zoom system.

17. The stereomicroscope according to claim 16, wherein the motor automatically adjusts the zoom position.

18. The stereomicroscope according to claim 12, further comprising means (17) for communicating the achievement of optical coincidence between the object reference measure (10) and the eyepiece reference measure (6a).

19. The stereomicroscope according to claim 12, wherein the object reference measure (10) is an object micrometer.

20. The stereomicroscope according to claim 12, wherein the eyepiece reference measure (6a)is a reticle plate.

21. The stereomicroscope according to claim 12, wherein the means for calculating magnifications for other zoom positions is operable to calculate magnifications for other zoom positions over an entire zoom range of zoom system (4) using the correction factor.

* * * * *